United States Patent [19]
Thom

[11] 4,257,182
[45] Mar. 24, 1981

[54] VARIABLE-BALLAST CHUMMING LURE

[76] Inventor: Joseph R. Thom, 1217 Johnson Ave., Point Pleasant, N.J. 08742

[21] Appl. No.: 71,740

[22] Filed: Aug. 31, 1979

[51] Int. Cl.³ .................... A01K 85/00; A01K 97/02
[52] U.S. Cl. .................... 43/42.06; 43/42.35
[58] Field of Search ................ 43/42.06, 42.22, 42.35, 43/43.14, 44.99

[56] References Cited

U.S. PATENT DOCUMENTS

| | | | |
|---|---|---|---|
| 2,218,421 | 10/1940 | Edgar | 43/42.22 |
| 2,488,678 | 11/1949 | Nardi | 43/42.06 |
| 2,532,879 | 12/1950 | Baker | 43/42.06 |
| 3,040,462 | 6/1962 | Guida | 43/42.06 |
| 3,096,598 | 7/1963 | Smolen | 43/42.06 |
| 3,309,811 | 3/1967 | Wimer | 43/42.06 |
| 3,705,465 | 12/1972 | Charney | 43/42.06 |
| 3,757,453 | 9/1973 | Therres | 43/43.14 |

FOREIGN PATENT DOCUMENTS

1366951  6/1964  France ..................... 43/44.99

*Primary Examiner*—Nicholas P. Godici
*Attorney, Agent, or Firm*—Charles F. Gunderson

[57] ABSTRACT

Hollow lures are ballasted by fluid means to achieve an optimum density for surf casting or trolling so that the lure can stay at the desired level for the game fish to be lured. Such a lure has a means for filling and emptying the body of the lure, to control the density. More particularly, the lure has one or more bulkheads to strengthen the hollow lure and to contain the fluid. These bulkheads may be perforated to any desired degree to control the flow of the fluid fore and aft within the lure. This provides a tail-heavy lure for maximum casting stability, and a level riding lure for its progress through the water. A valve in the body of the lure may also be used to release a controlled amount of fluid—for example a chemical chum—during the progress of the baitfish lure towards shore.

2 Claims, 6 Drawing Figures

VARIABLE-BALLAST CHUMMING LURE

BACKGROUND OF THE INVENTION

There are very many types of fishing lures of all conceivable sizes and shapes. They must be varied to accommodate many conditions of use as well as types of water and innumerable types of game fish. They must also be varied in density to function at the surface or at the bottom or in between. The problem is particularly accute for larger game fish and necessarily-larger bait fish. The weight of the lure itself also becomes significant in handling and storing.

Hollow lures are known, and some of these, presumeably, may have a fluid or other filling means to control or vary the density of the lure. However, hollow lures must inevitibly be weaker and subject to breakage in handling. Furthermore, unless they are completely filled, the filling may be unstable within the hollow lure, creating problems in the balance of the lure in casting and in action.

Lastly, none of the existing lures, however cleverly made or used, can do anything in the manner of the chum to further attract game fish.

It is therefore an object of this invention to provide a hollow lure that is reinforced at intervals along its axis to strengthen it against rough handling and abuse. It is a further object of this invention to provide a hollow fishing lure that can be filled with a fluid for control of the density of the lure. It is a further object of this invention to provide a hollow, liquid-filled fishing lure, for controlled casting with a rod, that has bulkheads perforated to permit the flow of the ballasting liquids within the lure for optimum casting as well as trolling. It is a further object of this invention to provide a fishing lure that can provide its own chumming action.

SUMMARY OF THE INVENTION

A hollow fishing lure has a series of perforated bulkheads across the inner body of the fish to strengthen the structure of the lure and to control the flow of the ballasting fluid within the body of the lure. Means are provided for filling and emptying the lure, and means may also be provided to control a seepage of fluid from the body of the lure, which may be a concentrated form of chum, to further enhance the effectiveness of the lure.

DESCRIPTION OF THE PREFERRED EMBODIMENT

Figure 1:
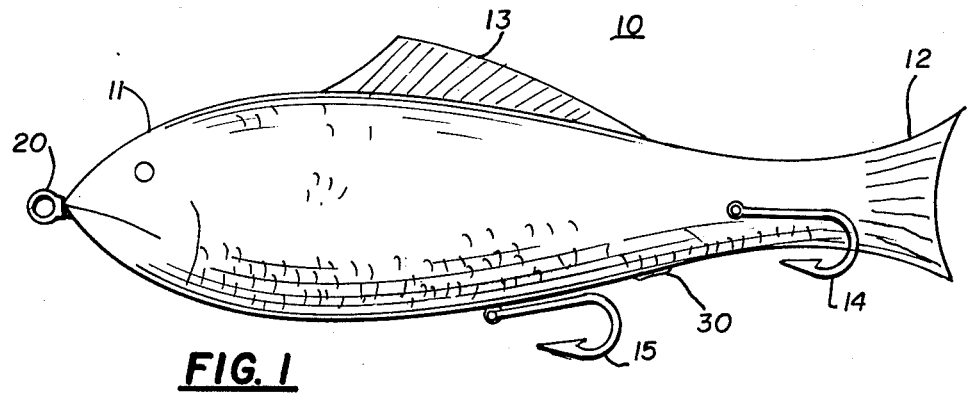
FIG. 1 shows a side view of the lure.

Referring now more particularly to FIG. 1, a bait-fish lure 10 is shown in profile with a body portion 11, a tail portion 12, a dorsal fin 13, and hooks 14 and 15. The lure may be attached to fishing gear, or filled with liquid, through the eye 20.

Figure 2:
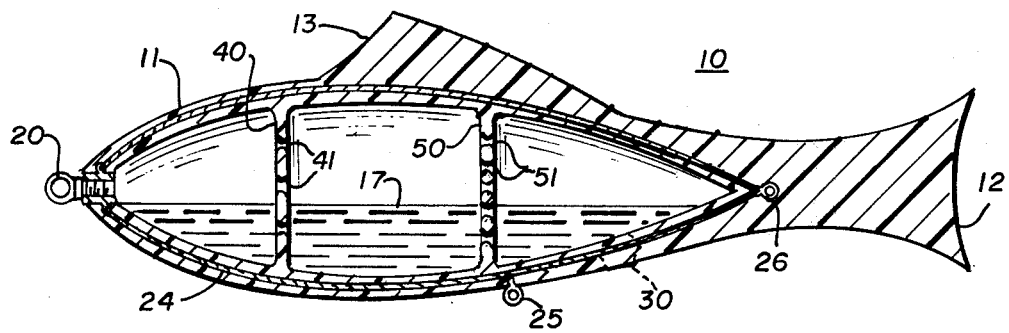
FIG. 2 shows a cross section of the side view.

FIG. 2 shows the same lure in cross section, with the same elements similarly numbered. This cross section also shows a fluid 17, as well as a reenforceing web or network 24 with fastenings 25 and 26 for hooks and the like. FIG. 2 shows a valve 30 to control the release of the fluid 17, and also shows bulkheads 40 and 50 with perforations 41 and 51 respectively to control the movement of the fluid.

Figures 3, 4, 5:
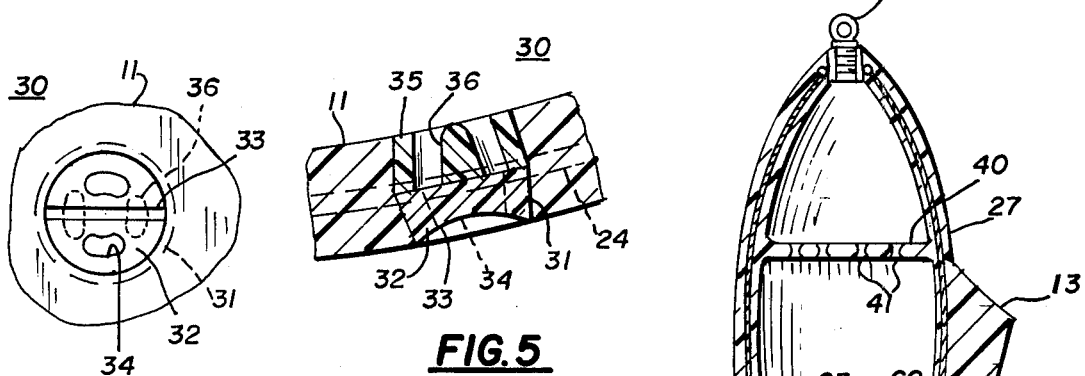
FIG. 3 shows another side view cross section of the lure in a vertical position.
FIG. 4 shows an enlarged cross section of the head portion of the lure.
FIG. 5 shows a cross section of a valve portion of the lure.

FIG. 3 shows another cross section of a similar baitfish lure in a vertical position with similar elements again similarly numbered. FIG. 3 shows the bulkhead 40, and another variation 60 of a bulkhead with an opening 61 to control the flow of the fluid 17. This bulkhead is more in the form of a funnel to encourage the flow of the fluid 17 to the tail portion of the lure when the lure is held in a vertical position. However another opening 62 along the bottom of the lure may be provided to facilitate the return of the fluid. This may be controled by a flap valve, such as 63, to provide a more rapid flow of the stabilizing fluid back into the forward chambers.

FIG. 4 shows an enlarged cross section of the connecting eye 20 and a portion of the head 11 of the lure. This detail shows a threaded connection 21 for the connecting eye into a correspondingly threaded socket 22. The outer portion of the socket may include fasteners 23 to secure the connecting eye assembly to the rest of the lure through the reinforcing wires or network 24.

Figure 6:
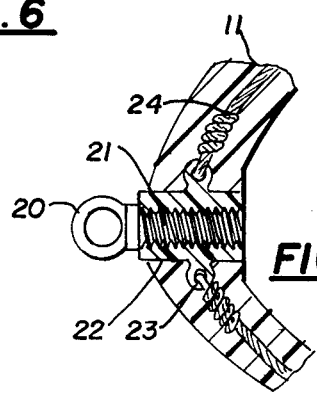
FIG. 6 shows a plan view of the same portion.

FIG. 5 is an enlarged cross section of the valve 30 that may control the fluid 17 without disturbing the filler eye 20. This valve may have a securing portion 31 that holds an outer portion 32 against an inner portion 35. A slot 33 may be used to rotate the outer portion 32 to bring the openings 34 of the top portion 32, seen more clearly in FIG. 6, into alignment with the openings 36 of the inner portion 35 to open the valve, or in the position shown in FIG. 6 to close it. The securing portion 31 of this valve assembly may also be attached to the reenforceing wires 24.

The valve 30 shown is a simple form of valve, easily operated by a coin, for example, to precisely control the flow of the fluid 17 out of the body of the bait fish lure. This would be particularly advantageous if the lure were filled with a fish oil or other concentrated liquid chum, and could add the very-much improved probability of catching certain game fish, under chumming conditions, that otherwise would be less probable. In fact, each additional cast would concentrate chum in the exact path of an individuals casting, for the unique benefit of the fisherman.

This or other similar valves may perform this function or facilitate the filling and emptying of the lure; rather than disturb the mounting eye, which may be directly and more securely built into the reenforceing wire network.

The mounting eye 20 is shown as a simple and logical place to connect the lure to the rest of the fishing tackle and to provide a removeable filler cap for the hollow lure. A simple threaded cap is shown, but it is obvious that other forms of caps or plugs—such as bayonet devices—would be applicable here and might be simpler to operate and less likely to become unattached. Nevertheless, if the mounting eye is to carry the weight of the lure in handling, in action, and against the pull of a game fish, it is obvious that it must be extremely-well secured to the body of the lure.

While the position that the fluid 17 seeks, as controlled by the perforations 41, 51 or 61 is intended to improve the function of the lure, the actual balance of the bait fish lure may include other static ballast, and diving vanes of well known types to control the motion of the lure, or keep it on an even keel. For example the lower portion of the lure may have heavier walls to maintain the lure in an upright condition regardless of the amount or position of the liquid ballast.

In operation, the bait fish would be drawn into an upright position as seen in FIG. 3 in preparation for a cast. The liquid or fluid 17 then flows into the tail to put the center of gravity in the tail to insure that the lure will ride free and not tumble in the air, and will land in the water facing in the desired direction towards the shore. As soon as the lure hits the water, the fluid will flow forward through the perforated bulkheads to provide the correct attitude for a swimming bait fish. The amount of time for this function can, obviously, be controlled by the size, number, and placement of the perforations.

The size, shape, and number of the bulkheads, and their placement will be a matter of choice and will depend on the performance desired and the reenforcement that may be needed. Similarly the number and the size of the perforations will be dependant on the desired rate of flow of the fluid from one end of the hollow bait fish to the other.

It is to be understood that I do not desire to be limited to the exact details of construction shown and described, for obvious modifications will occur to a person skilled in the art.

What is claimed is:

1. A variable-ballast chumming lure comprising a hollow replica of a bait fish; means for introducing a fluid within said hollow replica of a bait fish to control its density; at least one partition within said hollow replica of a bait fish, said partition having a one-way valve to permit the flow of said fluids faster from one end to the other; a valve mounted through the lower portion of said replica of a bait fish, said valve being able to release said fluid at a given, controllable rate.

2. A variable-ballast chumming lure as in claim 1 wherein said fluid is in the form of a liquid chum.

* * * * *